(12) United States Patent
Wilhelmi

(10) Patent No.: US 6,367,422 B1
(45) Date of Patent: Apr. 9, 2002

(54) PET TOOL

(76) Inventor: Frank Wilhelmi, 2333 Heywood St., Simi Valley, CA (US) 93065

( * ) Notice: Subject to any disclaimer, the term of this patent is extended or adjusted under 35 U.S.C. 154(b) by 0 days.

(21) Appl. No.: 09/444,266

(22) Filed: Nov. 22, 1999

(51) Int. Cl.$^7$ .............................................. A01K 13/00
(52) U.S. Cl. ...................................... 119/625; 119/633
(58) Field of Search ................................ 119/611, 612, 119/613, 614, 615, 616, 621, 624, 625, 633; 132/219, 126; 15/106

(56) References Cited

U.S. PATENT DOCUMENTS

| | | | | |
|---|---|---|---|---|
| 38,696 A | * | 5/1863 | Rockwell ..................... | 119/616 |
| 3,133,546 A | * | 5/1964 | Dent .......................... | 132/120 |
| 4,970,990 A | * | 11/1990 | Wilhelmi .................... | 119/601 |
| 5,365,881 A | * | 11/1994 | Sporn ......................... | 119/633 |
| 5,503,109 A | * | 4/1996 | Sporn ......................... | 119/633 |

* cited by examiner

Primary Examiner—Charles T. Jordan
Assistant Examiner—John W. Zerr
(74) Attorney, Agent, or Firm—Robert M. Sperry

(57) ABSTRACT

An improved pet brush having a handle of generally hexagonal cross-section with three relatively long sides interspersed with three relatively short sides extending upwardly from the brush head at an angle of approximately 10°–30° and having a thumb rest located at the juncture of the handle with the base on the upper surface of the handle, and a head of generally triangular, yet arcuate configuration formed with a single row of bristles extending along the periphery of the head.

13 Claims, 3 Drawing Sheets

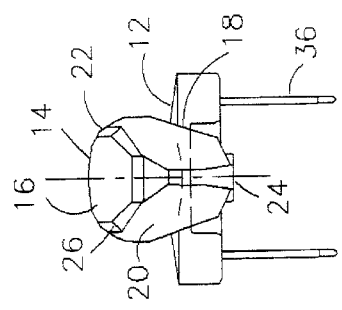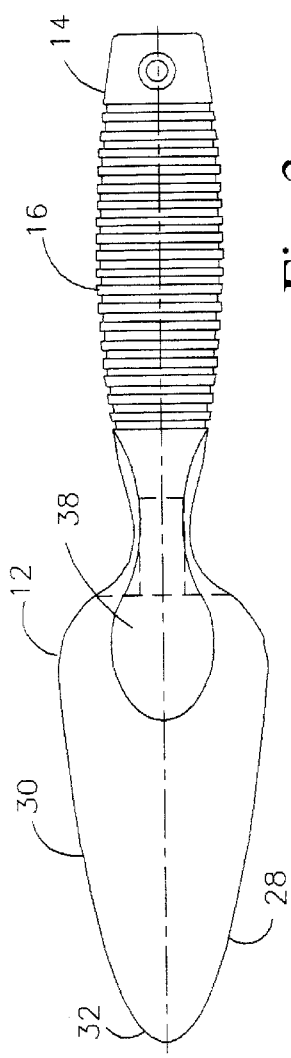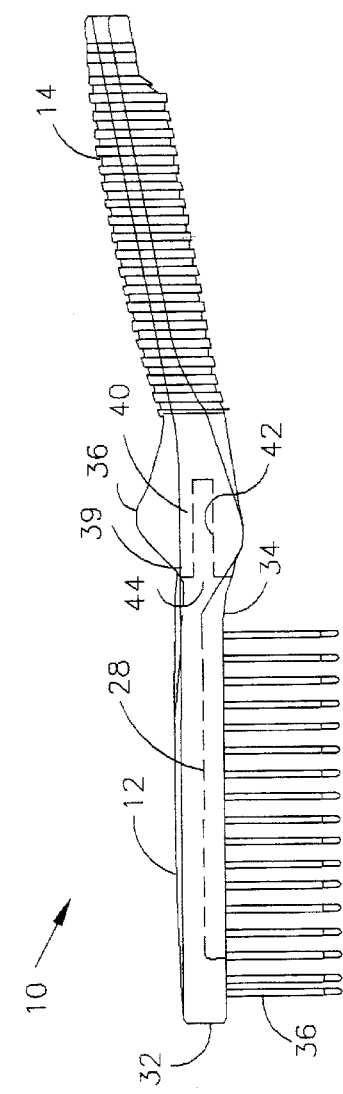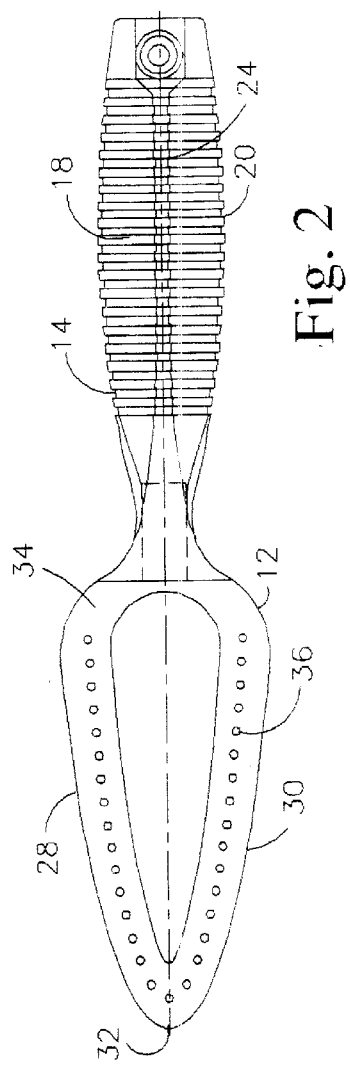

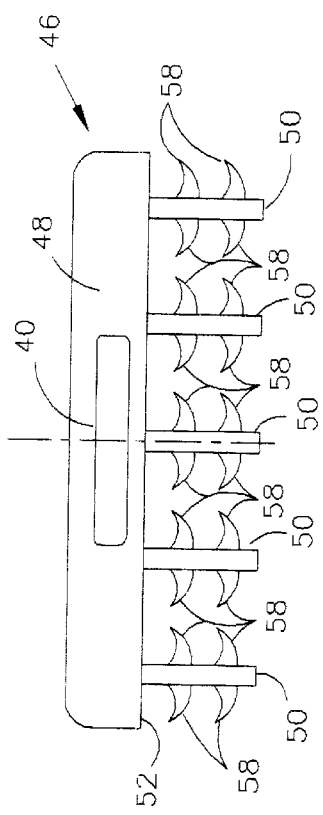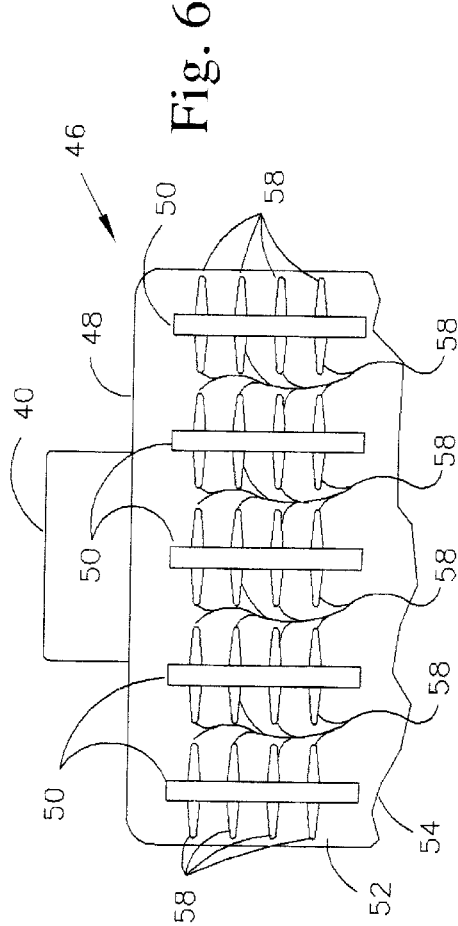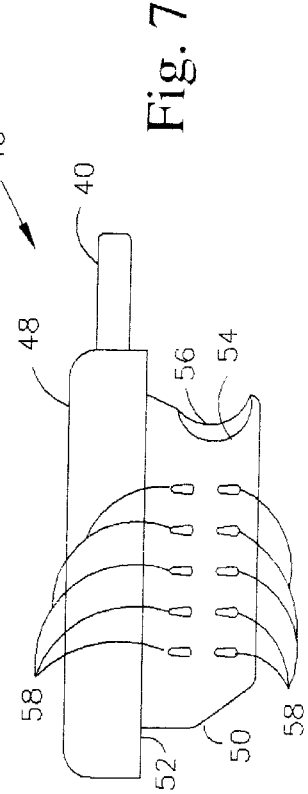

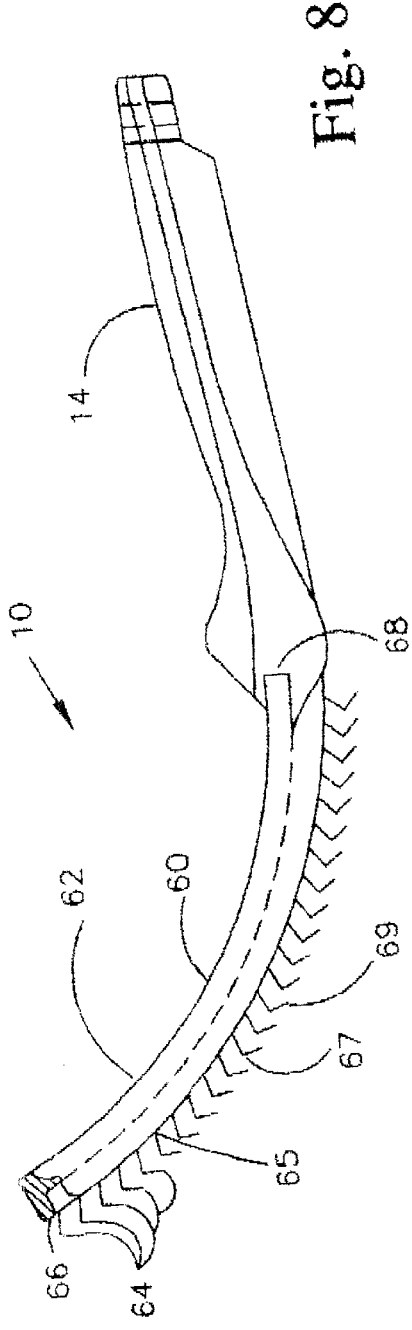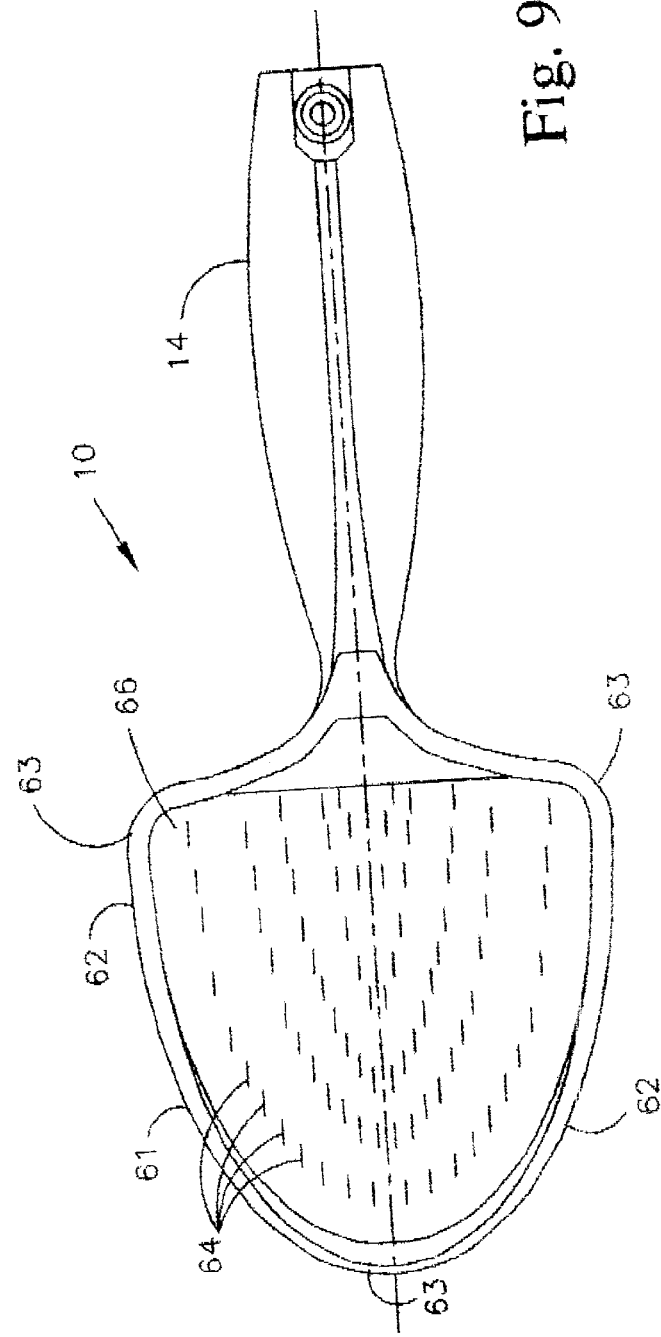

PET TOOL

FIELD OF INVENTION

This invention relates to pet supplies and is particularly directed to an improved tool for grooming pets which is ergonomically designed for use by either right- or left-handed persons and which provides smooth and thorough brushing in both longitudinal and lateral directions.

PRIOR ART

It is well known that frequent brushing of long haired pets promotes shiny and healthy coats and removes loose hair which could otherwise accumulate on furniture, clothing and the like and which can present health problems for persons with allergic reactions or breathing problems. Most prior art brushes include a relatively solid mass of closely mounted bristles. However, when brushing long haired pets, such masses of teeth tend to prevent penetration of the coat to the skin level, limiting removal of dead and tangled undercoat. Combs are ill-suited for removing undercoat because, while they penetrate well, the linear shape makes them awkward and ineffective. Transverse combs, referred to as "undercoat rakes", are typically wide and cannot effectively or completely reach concave areas of the pet's body. Furthermore, most prior art pet brushes are generally rectangular in shape. Unfortunately, such rectangular shapes are difficult to work in close areas, such as the connection between a dog's legs and its body. In addition, many brushes are formed for use primarily be either right-or left-handed people and are difficult and uncomfortable for others to use. Also, few prior art tools have been designed to have replaceable heads which can enable the user to quickly and easily adapt the tool for brushing, teasing and other grooming jobs. Finally, many prior art tools have handles which are uncomfortable or difficult to use and which do not enable the user to have maximum control over the movement and pressure of the brush at all times. Thus, none of the prior art pet tools have been entirely satisfactory.

BRIEF SUMMARY AND OBJECTS OF INVENTION

These disadvantages of the prior art are overcome with the present invention and an improved pet tool is provided having an ergonomically designed handle which is comfortable and easy to use by both right-and left-handed persons and which provides maximum control in all locations and conditions, yet which has replaceable heads to enable the user to quickly and easily adapt the tool for a variety of grooming chores and has a combing head formed with at least one row of teeth arranged in a generally triangular, yet arcuate, configuration to enable the tool provide maximum brushing surface for lateral strokes, yet being able to comfortably fit into tight areas of a pet's body and being relatively uncloggable, even with long and heavily matted hair.

These advantages of the present invention are preferably attained by providing an improved pet grooming tool having a handle of generally hexagonal cross-section with three relatively long sides interspersed with three relatively short sides extending upwardly from the tool head at an angle of approximately 10°–30° and having a thumb rest located at the juncture of the handle with the base on the upper surface of the handle, and a head of generally triangular, yet arcuate configuration formed with a at least one row of teeth extending along the periphery of the head. Also, the triangular cross section of the handle with curvilinear sides matches the three joints in human fingers and provides a very stable grip, reducing the hand force required to resist the torquing moment caused by combing and brushing.

Accordingly, it is an object of the present invention to provide an improved pet grooming tool.

Another object of the present invention is to provide an improved pet grooming tool which is comfortable and easy to use.

An additional object of the present invention is to provide an improved pet grooming tool having an ergonomically designed handle.

A further object of the present invention is to provide an improved pet grooming tool having an ergonomically designed handle which is comfortable and easy to use by both right-and left-handed persons.

Another object of the present invention is to provide an improved pet grooming tool which provides maximum control in all locations and conditions.

An additional object of the present invention is to provide an improved pet grooming tool which has replaceable heads to enable the user to quickly and easily adapt the tool for a variety of grooming chores.

A further object of the present invention is to provide an improved pet grooming tool having a combing head formed with at least one row of teeth arranged in a generally triangular, yet arcuate, configuration to enable the grooming tool to provide maximum brushing surface for lateral brush strokes, yet being able to comfortable fit into tight areas of a pet's body.

Another object of the present invention is to provide an improved pet grooming tool having a brushing head which is relatively uncloggable, even with long and heavily matted hair.

A specific object of the present invention is to provide an improved pet grooming tool having a handle of generally hexagonal cross-section with three relatively long sides interspersed with three relatively short sides extending upwardly from the brush head at an angle of approximately 10°–30° and having a thumb rest located at the juncture of the handle with the base on the upper surface of the handle, and a head of generally triangular, yet arcuate configuration formed with at least one row of teeth extending along the periphery of the head.

These and other objects and features of the present invention will be apparent from the following detailed description, taken with reference to the figures of the accompanying drawing.

BRIEF DESCRIPTION OF THE DRAWING

FIG. 1 is a side view of a pet grooming tool embodying the present invention;

FIG. 2 is a bottom view of the pet grooming tool of FIG. 1;

FIG. 3 is a top view of the pet grooming tool of FIG. 1;

FIG. 4 is a transverse section through the handle of the pet grooming tool of FIG. 1, taken on the line 4—4 of FIG. 1;

FIG. 5 is a side view of an alternative head for the pet grooming tool of FIG. 1;

FIG. 6 is a bottom view of the tool head of FIG. 5;

FIG. 7 is a front end view of the tool head of FIG. 5;

FIG. 8 is a side view of another alternative tool head for the grooming tool of FIG. 1; and FIG. 9 is a plan view of the tool head of FIG. 8.

DETAILED DESCRIPTION OF THE INVENTION

In that form of the present invention chosen for purposes of illustration, FIG. 1 shows a pet grooming tool, indicated generally at 10, having a head 12 and a handle 14. The handle 14 projects rearwardly and upwardly from the head 12 at an angle of approximately 10°–30° and has a cross-section of generally hexagonal configuration, having three relatively long sides 16, 18 and 20 interspersed with three relatively short sides 22, 24 and 26, as best seen in FIG. 4. It has been found that shaping the handle 14 in this manner provides the most comfortable grip for the user and the angled connection of the handle 14 to the head 12 enables the user to have maximum control over the movement and manipulation of the grooming tool 10. As best seen in FIGS. 2 and 3, the head is formed generally triangular, yet having arcuate sides 28 and 30 which converge to a rounded tip 32. Also, the underside 34 of the head 12 carries at least one row 36 of teeth which extend generally parallel to the sides 28 and 30. At its juncture with the head 12, the handle 14 has a raised flat area 38 having a generally spoon-shaped recess 39 formed forwardly of the raised area 38, which provides a convenient location for the user's thumb, regardless of whether the user is right-handed or left-handed, and which enables the user to apply maximum force in stroking the grooming tool 10 while resisting torquing moment caused by the brushing or grooming action. This ergonomic design serves to counteract the torquing moment of combing or brushing which gives the user greater control and significantly reduces or prevents injury due to repetitive motion syndrome.

In use, the user grasps the grooming tool 10 by placing their thumb on the raised area 38 and wrapping their fingers about the handle 14. Because of the generally hexagonal shape of the handle 14, the user's fingers will fit comfortably about the handle, giving the user a comfortable and sure grip for stroking the grooming tool 10 either transversely or parallel to the axis of the brush 10. Also, the generally triangular shape of the head 12 provides maximum area for stroking transversely to the axis of the tool, while the rounded tip 32 will fit comfortably into narrow areas, such as the space between a pets' upper leg and body. Furthermore, the upward angle of the handle 14 with respect to the head 12 enables the user to apply maximum strength in stroking the brush. These rows of teeth 36 allows thorough brushing of the pet, while preventing clogging of the bristles with hair, as frequently occurs where clusters of bristles are employed. Thus, the grooming tool 10 is ergonomically designed to provide maximum comfort to the user, while providing maximum control in manipulating the tool and preventing hair clogging.

If desired, the head 12 may be made replaceable, having a tail portion 40 which projects rearwardly from the head 12 and is insertable into a suitable recess 42 formed in the forward end 44 of the handle 14, as seen in dotted lines in FIG. 1. The tail portion 40 may be releasably retained in the recess 42 by a friction fit or, if desired, releasable fastening means, not shown, may be provided to releasably attach the head 12 to the handle 14. Also, if desired, alternative head members may be provided, such as that indicated generally at 46 in FIGS. 5–7. The head member 46 is designed for removing matted and shedding hair and comprises a base portion 48, formed with a suitable tail portion 40 for insertion into the recess 42 of the handle 14 of FIG. 1, and having a plurality of blades 50 mounted in parallel relation on the underside 52 of the head member 46 and extending transversely thereacross. As shown, one edge 54 of each of the blades 50 is formed with a sharpened curved surface 56 and the blades 50 are each formed with a plurality of curved tines 58 which project outwardly from the sides of the blades 50 to gently tease and rake the pet's hair as it passes between the blades 50.

FIGS. 8 and 9 show an alternative brush head, indicated generally at 60, having a body 62 which is generally triangular, as best seen in FIG. 9, having curvilinear sides 61 and rounded corners 63, to facilitate fitting into tight portions of a pet's body, and being arcuate in cross section. As seen in FIG. 8, curving outwardly and upwardly with a plurality of teeth 64 secured to its under surface 66 and having a tongue 68 for releasably attaching the head 60 to the handle 14. The curvature of the body 62 serves to add greater force and control to movement of the tool 10 during brushing and groom operations. As shown, the teeth 64 are generally V-shaped, having bases 65 secured to the body 62 and angling forwardly and outwardly from the body 62 to about their midpoint 67 and, thereafter angling rearwardly to end points 69, which approximately overly their bases 65. It is found that this shape for the teeth 64 provides maximum resilience, yet gives great strength for penetrating and removing undercoat.

Obviously, numerous other variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A pet grooming tool comprising:
    a brush head having a body which is arcuate in cross-section curving outrwardly and upwardly from a handle, and
    a handle of generally hexagonal cross-section with three relatively long sides interspersed with three relatively short sides.

2. The grooming tool of claim 1 further comprising:
    a thumb rest located at the juncture of said handle with said head on the upper surface of said handle.

3. The grooming tool of claim 1 wherein:
    said brush head is of generally triangular yet arcuate configuration formed with a single row of bristles extending along the periphery of said head.

4. The grooming tool of claim 1 wherein:
    said handle extends upwardly from the brush head at an angle of approximately 10°–30°.

5. The grooming tool of claim 1 wherein:
    said brush head is releasably attached to said handle.

6. The grooming tool of claim 1 wherein:
    said head carries a plurality of blades mounted in parallel relation on the underside of said head and extending transversely to the axis of said head.

7. The grooming tool of claim 6 wherein:
    each of said blades has one edge formed with a sharpened edge.

8. The grooming tool of claim 6 wherein:
    each of said blades carries a plurality of tines projecting outwardly therefrom.

9. The grooming tool of claim 7 wherein:
    said sharpened edges are curved.

10. The grooming tool of claim 1 wherein:
    a plurality of said heads are provided and are each interchangeably releasably attachable to said handle.

11. The grooming tool of claim 1 further comprising:
a pluralilty of teeth secured to the underside of said brush head.

12. The grooming tool of claim 1 wherein:
each of said teeth has a base secured to the under side of said brush head and extending rearwardly and upwardly from said base to a midpoint and, thereafter, extending upwardly and forwardly to an end point approximately overlying said base.

13. The grooming tool of claim 2 wherein:
said thumb rest comprises a generally triangular raised area with a generally spoon-shaped recess formed forwardly of said raised area.

* * * * *